(12) United States Patent
Haataja et al.

(10) Patent No.: US 8,886,004 B2
(45) Date of Patent: Nov. 11, 2014

(54) OPTICAL CABLE EXIT TROUGH

(75) Inventors: Timothy Jon Haataja, Prior Lake, MN (US); Thomas Walter Kampf, Minnetonka, MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 11/636,373

(22) Filed: Dec. 7, 2006

(65) Prior Publication Data

US 2007/0253672 A1 Nov. 1, 2007

Related U.S. Application Data

(60) Continuation of application No. 11/158,287, filed on Jun. 21, 2005, now Pat. No. 7,167,625, which is a continuation of application No. 10/871,641, filed on Jun. 18, 2004, now Pat. No. 6,925,242, which is a continuation of application No. 10/457,749, filed on Jun. 9, 2003, now Pat. No. 6,868,220, which is a continuation of application No. 09/745,299, filed on Dec. 20, 2000, now Pat. No. 6,597,854, which is a continuation of application No. 09/354,594, filed on Jul. 16, 1999, now Pat. No. 6,192,181, which is a division of application No. 08/971,421, filed on Nov. 17, 1997, now Pat. No. 5,937,131.

(51) Int. Cl.
*G02B 6/00* (2006.01)
*H02G 3/04* (2006.01)
*G02B 6/44* (2006.01)
*H02G 3/06* (2006.01)

(52) U.S. Cl.
CPC ............ *G02B 6/4459* (2013.01); *H02G 3/0437* (2013.01); *H02G 3/0608* (2013.01)
USPC ............ 385/136; 365/134; 365/135; 365/137

(58) Field of Classification Search
USPC .................................................. 385/134–137
See application file for complete search history.

(56) References Cited

U.S. PATENT DOCUMENTS 3,001,001 A 9/1961 Bibb
4,163,572 A 8/1979 Benscoter
(Continued)

FOREIGN PATENT DOCUMENTS

DE 37 42 448 A1 6/1989
FR 1207610 6/1958
(Continued)

OTHER PUBLICATIONS

ADC Telecommunications brochure entitled "FiberGuide® Fiber Management Systems," 33 pages, dated Oct. 1995.

(Continued)

*Primary Examiner* — Uyen Chau N Le
*Assistant Examiner* — John M Bedtelyon
(74) *Attorney, Agent, or Firm* — Merchant & Gould P.C.

(57) ABSTRACT

A cable exit trough is mountable to a lateral trough section either during initial assembly of the cable routing system, or at a later date. The exit trough includes a bracket portion mountable to the top edge of one of the sides of the lateral trough section. Two lead-ins are provided to lead the cable in an upward direction from the lateral trough section to the exit trough. The exit trough includes an exit trough portion extending from the bracket portion upwardly away from the lateral trough section. The exit trough portion includes a convexly curved bottom trough surface, and two convexly curved upstanding sides. The exit trough portion and the lead-ins define a cable pathway from the lateral trough section to an exit point of the exit trough portion which can either lead downwardly relative to the lateral trough section or horizontally.

15 Claims, 16 Drawing Sheets

(56) References Cited

U.S. PATENT DOCUMENTS

| | | | |
|---|---|---|---|
| 4,366,341 A | | 12/1982 | van Riet |
| 4,860,168 A | | 8/1989 | Wiljanen et al. |
| 4,926,009 A | | 5/1990 | Van Leeuwen |
| 5,067,678 A | | 11/1991 | Henneberger et al. |
| 5,142,606 A | * | 8/1992 | Carney et al. ............... 385/134 |
| 5,271,585 A | * | 12/1993 | Zetena, Jr. .................... 248/49 |
| 5,316,243 A | | 5/1994 | Henneberger |
| 5,316,244 A | | 5/1994 | Zetena, Jr. |
| 5,399,814 A | * | 3/1995 | Staber et al. ................ 174/135 |
| 5,402,515 A | | 3/1995 | Vidacovich et al. |
| 5,530,787 A | | 6/1996 | Arnett |
| 5,753,855 A | | 5/1998 | Nicoli et al. |
| 5,872,336 A | | 2/1999 | Long |
| 5,937,131 A | | 8/1999 | Haataja et al. |
| 6,044,194 A | * | 3/2000 | Meyerhoefer ............... 385/134 |
| 6,192,181 B1 | | 2/2001 | Haataja et al. |
| 6,597,854 B2 | | 7/2003 | Haataja et al. |
| 6,868,220 B2 | | 3/2005 | Haataja et al. |
| 6,925,242 B2 | | 8/2005 | Haataja et al. |
| 7,167,625 B2 | | 1/2007 | Haataja et al. |
| 8,582,944 B2 | | 11/2013 | Haataja et al. |
| 2008/0199141 A1 | | 8/2008 | Haataja et al. |
| 2011/0225797 A1 | | 9/2011 | Haataja |
| 2011/0229103 A1 | | 9/2011 | Haataja |

FOREIGN PATENT DOCUMENTS

| | | |
|---|---|---|
| FR | 2488064 | 7/1980 |
| GB | 2137025 | 2/1984 |

OTHER PUBLICATIONS

Warren & Brown & Staff brochure pages entitled "lightpaths," Issue 2, 11 pages, dated 1995.
Warren & Brown & Staff Pty Ltd brochure pp. entitled "Optical Fibre Ductwork," 2 pages, undated.
ADC Telecommunications brochure entitled "Fiber Guide™ Fiber Management System," 6 pages, dated Jun. 1989.
AT&T Network Systems literature entitled, "Facility Network Management System," 3 pages, the third page of which is dated Mar. 27, 1991.
AT&T advertisement literature entitled, "Facility Network Management System" believed to correspond to system shown in Exhibit E, p. 3 of which is dated Mar. 27, 1991.
"Memorandum Opinion and Order" filed Apr. 24, 2002 by United States District Court Judge Ann Montgomery in the action titled *ADC Telecommunications, Inc. v. Panduit Corp.*, Civil No. 01-477 ADM/AJB, pp. 1-24.
"Defendant's Prior Art List" dated Oct. 1, 2001 in the action titled *ADC Telecommunications, Inc. v. Panduit Corp.*, Civil Action No. 01-CV-477 ADM/AJB. pp. 1-29.
"Report Number: 02.3-02" by Eric Pearson of Pearson Technologies Incorporated, served Apr. 22, 2002 in the action titled *ADC Telecommunications, Inc. v. Panduit Corp.*, Civil Action No. 01-CV-477 ADM/AJB. pp. 1-37 and Exhibits 1 and 2.
"Defendant's Responses to Plaintiff's First Set of Interrogatories" dated Dec. 14, 2001 in the action titled *ADC Telecommunications, Inc. v. Fiber Management Solutions, Inc.*, Case No. CV 01 3974 ADS, pp. 1-12.
Request for Ex Parte Reexamination of 6,192,181; dated Nov. 6, 2008; 18 pages.
Ex Parte Communication re 6,192,181; dated Dec. 22, 2008; 9 pages.
Request for Inter Partes Reexamination of 6,597,854; dated Nov. 6, 2008; 95 pages.
Request for Inter Partes Reexamination of 6,868,220; dated Nov. 6, 2008; 37 pages.
Request for Inter Partes Reexamination of 6,925,242; dated Nov. 6, 2008; 40 pages.
Request for Inter Partes Reexamination of 7,167,625; dated Nov. 6, 2008; 26 pages.
Decision Granting Ex Parte Reexamination of 6,192,181; dated Dec. 22, 2008; 10 pages.
Decision Granting Inter Partes Reexamination of 6,597,854; dated Jan. 12, 2009; 14 pages.
Office Action in 6,597,854 Reexamination; dated Jan. 12, 2009; 18 pages.
Decision Granting Inter Partes Reexamination of 6,868,220; dated Jan. 12, 2009; 13 pages.
Office Action in 6,868,220 Reexamination; dated Jan. 12, 2009; 15 pages.
Decision Granting Inter Partes Reexamination of 6,925,242; dated Jan. 12, 2009; 12 pages.
Office Action in 6,925,242 Reexamination; dated Jan. 12, 2009; 15 pages.
Decision Granting Inter Partes Reexamination of 7,167,625; dated Jan. 12, 2009; 12 pages.
Office Action in 7,167,625 Reexamination; dated Jan. 12, 2009; 15 pages.
First Amended Complaint, *ADC Telecommunications, Inc. v. Panduit Corp.*, Civil Action No. 07-CV-04452-DWF-SRN, 6 pages (Aug. 4, 2008).
Answer, Affirmative Defenses and Counterclaims of Defendant Panduit Corp. to Plaintiff's First Amended Complaint, *ADC Telecommunications, Inc. v. Panduit Corp.*, Civil Action No. 07-CV-04452-DWF-SRN, 13 pages (Sep. 22, 2008).
ADC's Reply to Counterclaims, *ADC Telecommunications, Inc. v. Panduit Corp.*, Civil Action No. 07-CV-04452-DWF-SRN, 5 pages (Oct. 13, 2008).
Third Party Requester's Reply in 6,925,242 Reexamination, dated Apr. 13, 2009; 23 pages.
Third Party Requester's Reply in 6,868,220 Reexamination, dated Apr. 13, 2009; 28 pages.
Third Party Requester's Reply in 7,167,625 Reexamination, dated Apr. 13, 2009; 21 pages.
Third Party Requester's Reply in 6,597,854 Reexamination, dated Apr. 13, 2009; 33 pages.
Office Action from related U.S. Appl. No. 09/745,299; dated Dec. 18, 2001; 8 pages.
Office Action from related U.S. Appl. No. 10/457,749; dated Sep. 12, 2003; 4 pages.
Office Action from related U.S. Appl. No. 10/871,641; dated Sep. 29, 2004; 5 pages.
Office Action from related U.S. Appl. No. 11/158,287; dated Dec. 13, 2005; 5 pages.
Office Action from related U.S. Appl. No. 12/148,880; dated Oct. 8, 2008; 17 pages.
Office Action from related U.S. Appl. No. 12/148,880; dated 14/15/2009; 14 pages.
Office Action in 6,192,181 Reexamination; dated May 1, 2009; 8 pages.
Office Action in 6,597,854 Reexamination; dated Jul. 2, 2009; 30 pages.
Office Action in 6,868,200 Reexamination; dated Jul. 13, 2009; 23 pages.
Office Action in 6,925,242 Reexamination; dated Jul. 14, 2009; 19 pages.
Office Action in 7,167,625 Reexamination; dated Jul. 13, 2009; 17 pages.
Office Action in 6,192,181 Reexamination; dated Nov. 20, 2009; 10 pages.
Right of Appeal Notice in 6,597,854 Re-examination; dated Dec. 4, 2009; 19 pages.
Right of Appeal Notice in 6,868,220 Re-examination; dated Dec. 4, 2009; 17 pages.
Right of Appeal Notice in 6,925,242 Re-examination; dated Dec. 14, 2009; 14 pages.
Right of Appeal Notice in 7,167,625 Re-examination; dated Dec. 14, 2009; 13 pages.
Record of Oral Hearing, mailed Jun. 7, 2011, for the Oral Hearing held on Mar. 9, 2011 in 6,597,854; 6,868,220; 6,925,242; and 7,167,625 Reexaminations (77 Pages).
Decision on Appeal in 6,597,854 Reexamination, dated Jun. 22, 2011; (60 pages).

(56) References Cited

OTHER PUBLICATIONS

Decision on Appeal in 6,868,220 Reexamination, dated Jun. 22, 2011; (47 pages).
Decision on Appeal in 6,925,242 Reexamination, dated Jun. 22, 2011; (61 pages).
Decision on Appeal in 7,167,625 Reexamination, dated Jun. 22, 2011; (36 pages).
Haataja et al., U.S. Appl. No. 13/149,557, filed May 31, 2011, titled "Optical Cable Exit Trough," which claims priority to the present application.
Haataja et al., U.S. Appl. No. 13/149,590, filed May 31, 2011, titled "Optical Cable Exit Trough," which claims priority to the present application.
Third Party Requester's Comments on Patentees' Response Requesting Reopening of Prosecution with attachments in Reexamination Control No. 95/000,411 dated Sep. 22, 2011.
Office Action in Reexamination Control No. 95/000,411 mailed Oct. 7, 2011.
Third Party Requester's Comments on Patentees' Response Requesting Reopening of Prosecution with attachments in Reexamination Control No. 95/000,415 dated Sep. 22, 2011.
Office Action in Reexamination Control No. 95/000,415 mailed Oct. 14, 2011.
Third Party Requester's Comments Under 37 C.F.R. §41.77(e) in Response to Examiner's Determination in Reexamination Control No. 95/000,411 dated Nov. 4, 2011.
Patent Owner's Reply to Third Party Requester's Comments Under 37 C.F.R. § 41.77(e) in Reexamination Control No. 95/000,411 dated Dec. 5, 2011.
Third Party Requester's Comments Under 37 C.F.R. §41.77(e) in Response to Examiner's Determination in Reexamination Control No. 95/000,415 dated Nov. 14, 2011.
Patent Owner's Reply to Third Party Requester's Comments Under 37 C.F.R. § 41.77(e) in Reexamination Control No. 95/000,415 dated Dec. 13, 2011.
Memorandum Opinion and Order dated Dec. 11, 2002; Case No. 01-477 ADM/JGL.
Third Party Requester's Appeal Brief in 6,597,854 Reexamination, dated Jun. 7, 2010; 77 pages.
Third Party Requester's Appeal Brief in 6,868,220 Reexamination, dated Mar. 19, 2010; 56 pages.
Third Party Requester's Appeal Brief in 6,925,242 Reexamination, dated Jun. 7, 2010; 57 pages.
Third Party Requester's Appeal Brief in 7,167,625 Reexamination, dated Mar. 22, 2010; 39 pages.
Third Party Requester's Response in 6,597,854 Reexamination, dated Jun. 7, 2010; 31 pages.
Third Party Requester's Response in 6,868,220 Reexamination, dated Jun. 7, 2010; 30 pages.
Third Party Requester's Response in 6,925,242 Reexamination, dated Jun. 7, 2010; 30 pages.
Third Party Requester's Response in 7,167,625 Reexamination, dated Apr. 22, 2010; 26 pages.
Examiner's Answer in 6,597,854 Reexamination, dated Sep. 13, 2010; 3 pages.
Examiner's Answer in 6,868,220 Reexamination, dated Sep. 13, 2010; 3 pages.
Examiner's Answer in 6,925,242 Reexamination, dated Sep. 20, 2010; 3 pages.
Examiner's Answer in 7,167,625 Reexamination, dated Sep. 13, 2010; 3 pages.
Third Party Requester's Rebuttal Brief in 6,597,854 Reexamination, dated Oct. 13, 2010; 27 pages.
Third Party Requester's Rebuttal Brief in 6,868,220 Reexamination, dated Oct. 13, 2010; 18 pages.
Third Party Requester's Rebuttal Brief in 6,925,242 Reexamination, dated Oct. 20, 2010; 21 pages.
Third Party Requester's Rebuttal Brief in 7,167,625 Reexamination, dated Oct. 13, 2010; 17 pages.

Third Party Requester's Request for Rehearing; U.S. Appl. No. 95/000,412; dated Jul. 22, 2011.
Patentee' Response to Third Party Requester's Request for Rehearing in Reexamination; U.S. Appl. No. 95/000,412; dated Aug. 22, 2011.
Third Party Requester's Request for Rehearing; U.S. Appl. No. 95/000,413; dated Jul. 22, 2011.
Patentee' Response to Third Party Requester's Request for Rehearing in Reexamination; U.S. Appl. No. 95/000,413; dated Aug. 22, 2011.
Patent Owner's Response Requesting Reopening of Prosecution; U.S. Appl. No. 95/000,411; dated Aug. 22, 2011.
Patent Owner's Response Requesting Reopening of Prosecution; U.S. Appl. No. 95/000,415; dated Aug. 22, 2011.
Declaration of David E. Rapp; U.S. Appl. No. 95/000,411; dated Jun. 22, 2011; 5 pgs.
Declaration of David E. Rapp; U.S. Appl. No. 95/000,415 dated Jun. 22, 2011; 5 pgs.
Board of Patent Appeals and Interferences, Decision on Examiner's Determination under 37 C.F.R. § 41.77(d), in Reexamination Control No. 95/000,411, dated Jun. 8, 2012, 24 pages.
Board of Patent Appeals and Interferences, Decision on Examiner's Determination under 37 C.F.R. § 41.77(d), in Reexamination Control No. 95/000,415, dated Jun. 8, 2012, 23 pages.
Notice of Appeal to U.S. Court of Appeals for the Federal Circuit under 37 CFR § 1.302, in Reexamination Control No. 951000,412, dated Apr. 23, 2012, 61 pages.
Notice of Appeal to U.S. Court of Appeals for the Federal Circuit under 37 CFR § 1.302, in Reexamination Control No. 951000,413, dated Apr. 23, 2012, 43 pages.
Office Action from related U.S. Appl. No. 12/148,880; dated Mar. 27, 2012; 25 pages.
Third Party Requester's Brief for Appellant, Panduit Corp. in Reexamination Control No. 95/000,413, dated Aug. 6, 2012, 90 pages.
Third Party Requester's Brief for Appellant, Panduit Corp. in Reexamination Control No. 95/000,412, dated Aug. 6, 2012, 120 pages.
Third Party Requester's Request for Rehearing under 37 C.F.R. § 41.79, in Reexamination Control No. 95/000,411, dated Jul. 6, 2012, 10 pages.
Third Party Requester's Request for Rehearing under 37 C.F.R. § 41.79, in Reexamination Control No. 95/000,415, dated Jul. 6, 2012, 11 pages.
Patent Owner's Principal and Response Brief in Reexamination Control No. 95/000,412 dated Oct. 4, 2012, 96 pages.
Patent Owner's Principal and Response Brief in Reexamination Control No. 95/000,413 dated Oct. 4, 2012, 92 pages.
Office Action from related U.S. Appl. No. 12/148,880; dated Dec. 21, 2012; 27 pages.
Office Action from related U.S. Appl. No. 12/148,880; dated May 9, 2013; 17 pages.
Office Action from related U.S. Appl. No. 12/149,590; dated Dec. 21, 2012; 27 pages.
Director of Patent Office Brief in Reexamination Control No. 95/000,413 dated Feb. 13, 2013, 49 pages.
Director of Patent Office Brief in Reexamination Control No. 95/000,412 dated Feb. 13, 2013, 64 pages.
Third Party Requester's Response and Reply Brief for Appellant, Panduit Corp. in Reexamination Control No. 95/000,413, dated Feb. 27, 2013, 59 pages.
Third Party Requester's Response and Reply Brief for Appellant, Panduit Corp. in Reexamination Control No. 95/000,412, dated Feb. 27, 2013, 76 pages.
Patent Owner's Reply Brief in Reexamination Control No. 95/000,412 dated Mar. 18, 2013, 35 pages.
Patent Owner's Reply Brief in Reexamination Control No. 95/000,413 dated Mar. 18, 2013, 28 pages.
Notice of Appeal to U.S. Court of Appeals for the Federal Circuit under 37 CFR § 1.302, in Reexamination Control No. 95/000,411, dated May 21, 2013, 37 pages.
Notice of Appeal to U.S. Court of Appeals for the Federal Circuit under 37 CFR § 1.302, in Reexamination Control No. 95/000,415, dated Apr. 26, 2011, 42 pages.

(56) References Cited

OTHER PUBLICATIONS

Board of Patent Appeals and Interferences, Decision on Rehearing, in Reexamination Control No. 95/000,411, dated Mar. 27, 2013, 12 pages.
Board of Patent Appeals and Interferences, Decision on Rehearing, in Reexamination Control No. 95/000,412, dated Feb. 23, 2012, 12 pages.
Board of Patent Appeals and Interferences, Decision on Rehearing, in Reexamination Control No. 95/000,413, dated Feb. 24, 2012, 5 pages.
Board of Patent Appeals and Interferences, Decision on Rehearing, in Reexamination Control No. 95/000,415, dated Feb. 27, 2013, 17 pages.
Office Action from related U.S. Appl. No. 12/148,880; dated Dec. 9, 2013; 25 pages.
Brief for Appellant for Control No. 95/000,415, Panduit Corporation, Sep. 11, 2013, 165 pages.
Brief for Appellant for Control No. 95/000,411, Panduit Corporation, Oct. 8, 2013, 155 pages.
Appellee ADC Telecommunications, Inc.'s Response Brief for Control No. 95/000,415, Oct. 24, 2013, 58 pages.
Cross Appellant ADC Telecommunications, Inc.'s Principal and Response Brief for Control No. 95/000,411, Nov. 22, 2013, 94 pages.
Appellant Panduit Corporation's Reply in Further Support of Opposed Motion Requesting Judicial Notice of Dictionary Definitions for Control No. 95/000,415, Dec. 5, 2013, 11 pages.
Response and Reply Brief for Appellant for Control No. 95/000,411, Panduit Corporation, Jan. 3, 2014, 63 pages.
Brief for Appellant for Control No. 95/000,411, Panduit Corporation, Jan. 21, 2014, 38 pages.

\* cited by examiner

OPTICAL CABLE EXIT TROUGH

CROSS REFERENCE TO RELATED APPLICATIONS

This application is a continuation of application Ser. No. 11/158,287, filed Jun. 21, 2005; now U.S. Pat. No. 7,167,625 which is continuation of application Ser. No. 10/871,641, filed Jun. 18, 2004, now U.S. Pat. No. 6,925,242; which is a continuation of application Ser. No. 10/457,749, filed Jun. 9, 2003, now U.S. Pat. No. 6,868,220; which is a continuation application of Ser. No. 09/745,299, filed Dec. 20, 2000, now U.S. Pat. No. 6,597,854; which is a continuation of application Ser. No. 09/354,594, filed Jul. 16, 1999, now U.S. Pat. No. 6,192,181; which is a divisional of application Ser. No. 08/971,421, filed Nov. 17, 1997, now U.S. Pat. No. 5,937,131. The above listed applications are incorporated herein by reference.

FIELD OF THE INVENTION

The invention pertains to a system for the management and routing of optical fiber cables.

BACKGROUND OF THE INVENTION

In the telecommunications industry, the use of optical fibers for signal transmissions is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not be bent beyond a minimum radius of curvature. For example, it is commonly recognized that optical fibers should not be bent in a radius of less than 1.5 inches.

SUMMARY OF THE INVENTION

According to preferred embodiments of the present invention, a cable routing system is disclosed for routing optical fiber cables between optical transmission equipment. The system includes a lateral trough section configured for defining a cable pathway. An exit trough is mountable to the lateral trough section to provide a cable exit pathway from the lateral trough section. The exit trough includes a bracket portion mountable to a top edge of the lateral trough section. Two curved lead-ins on opposite ends of the bracket portion each define a cable pathway leading to an exit trough portion extending from a middle of the bracket portion in a direction away from the lateral trough section. The exit trough portion includes a convexly curved bottom trough surface, and two convexly curved upstanding sides on opposite sides of the bottom trough surface. The exit trough defines a cable pathway leading upwardly and away from the lateral trough section. The exit trough is mountable to the lateral trough section without modification to the lateral trough section. The exit trough can be placed generally at any location along the lateral trough section, and can be placed during initial system setup, or at a later time as the need arises for an exit pathway from the lateral trough section, such as when new optical transmission equipment is added to the system. At least one fastener secures the bracket portion to the lateral trough section. The exit trough may include a downspout portion defining a downwardly directed cable pathway, or a horizontal portion defining a horizontally directed cable pathway, or other directional pathway as desired.

DETAILED DESCRIPTION OF THE PREFERRED EMBODIMENTS

Figure 1:
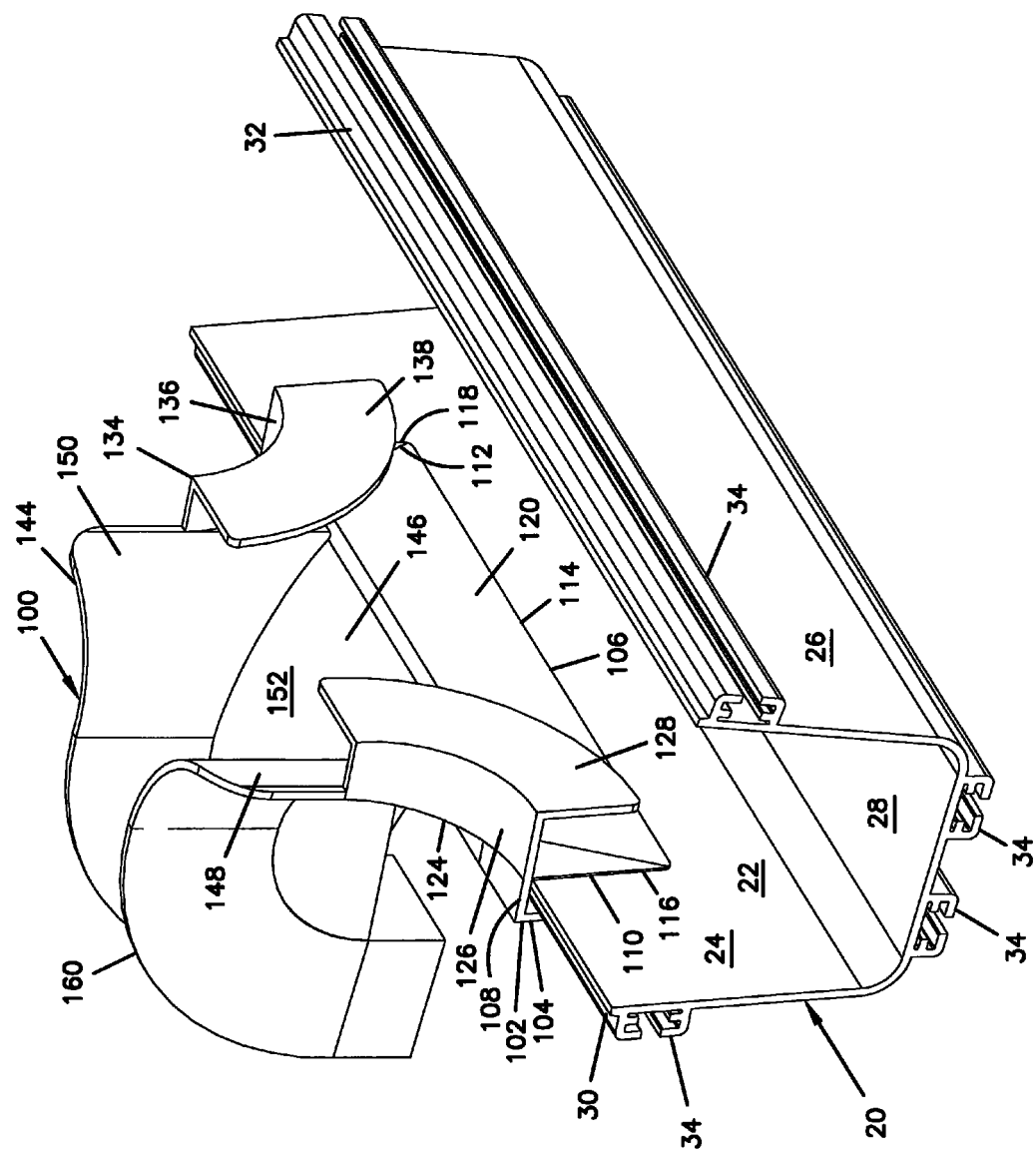
FIG. 1 is a top, front, and left side perspective view of a lateral trough section and an exit trough mounted thereto according to one preferred embodiment of the present invention.

Referring now to FIGS. 1-8, a first embodiment of an exit trough 100 is shown mounted to a lateral trough section 20. Lateral trough section 20 defines a cable pathway 22 for routing optical fiber cables between locations. Lateral trough section 20 and exit trough 100 can be part of a cable routing system typically within a structure, such as a building having optical fiber signal transmitting equipment. Lateral trough section 20 typically is suspended from a ceiling structure by any suitable means (not shown). U.S. Pat. Nos. 5,067,678 and 5,316,243 disclose various cable routing systems, including lateral trough sections like lateral trough section 20 illustrated in FIGS. 1-8. Exit trough 100 is not only usable with lateral trough section 20 shown in FIGS. 1-8, but also with other cable routing systems disclosed in U.S. Pat. Nos. 5,067,678 and 5,316,243, the disclosures of which are hereby incorporated by reference, and other cable routing systems.

Generally, lateral trough section 20 includes first and second upstanding sides 24, 26, and a bottom 28 extending therebetween and defining cable pathway 22. Side 24 includes a top edge 30. Opposite side 26 also includes similar top edge 32. Lateral trough section 20 includes a plurality of attachment members 34 on an outside portion for use in attaching lateral trough sections 20 together end to end, or adding other system hardware.

As will be described below, exit trough 100 mounts to lateral trough section 20 adjacent to top edge 30 of side 24 through attachment member 34. Exit trough 100 creates a cable exit pathway from lateral trough section 20.

Figure 2:
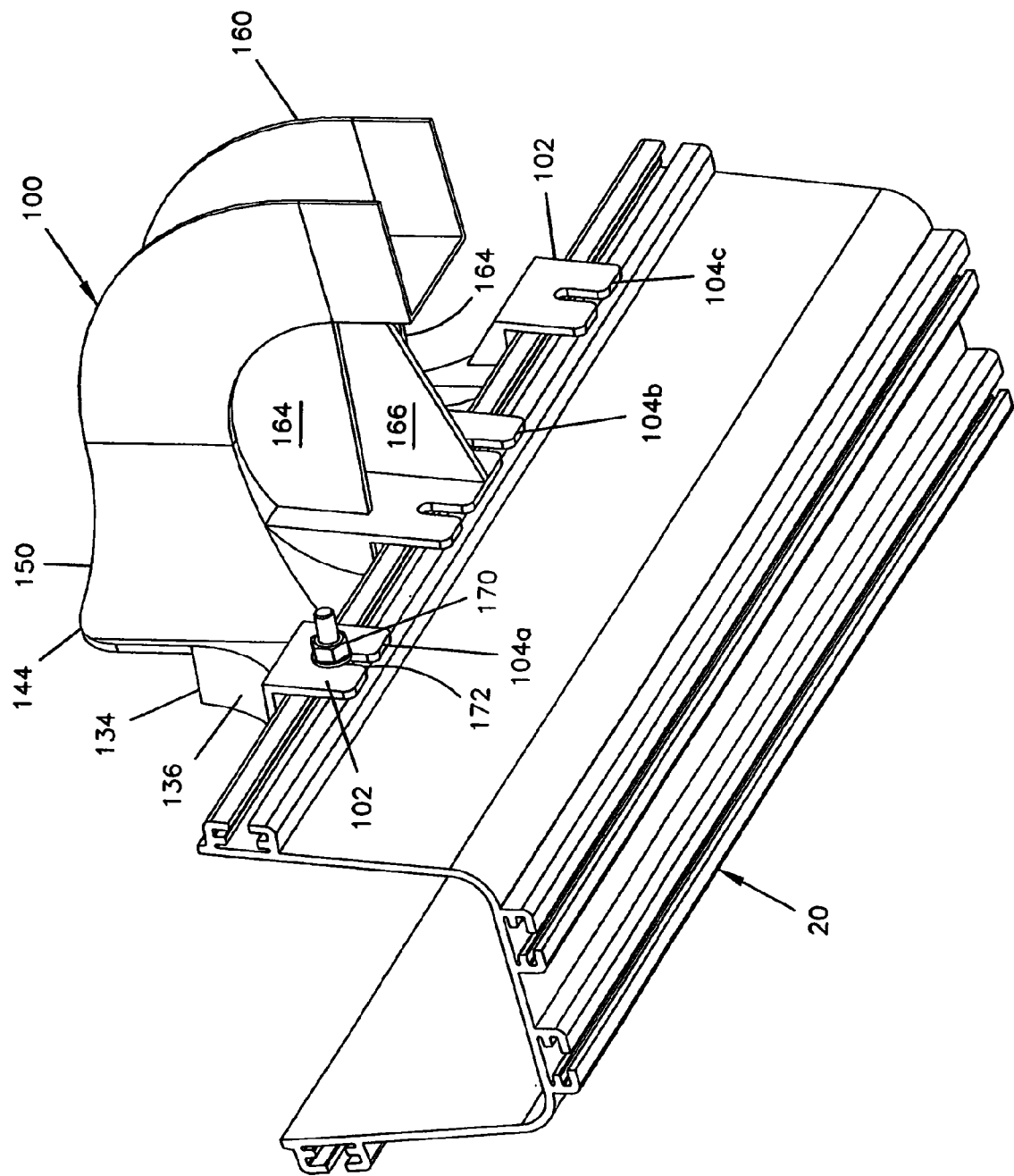
FIG. 2 is a bottom, back, and right side perspective view of the first embodiment.
Figure 3:
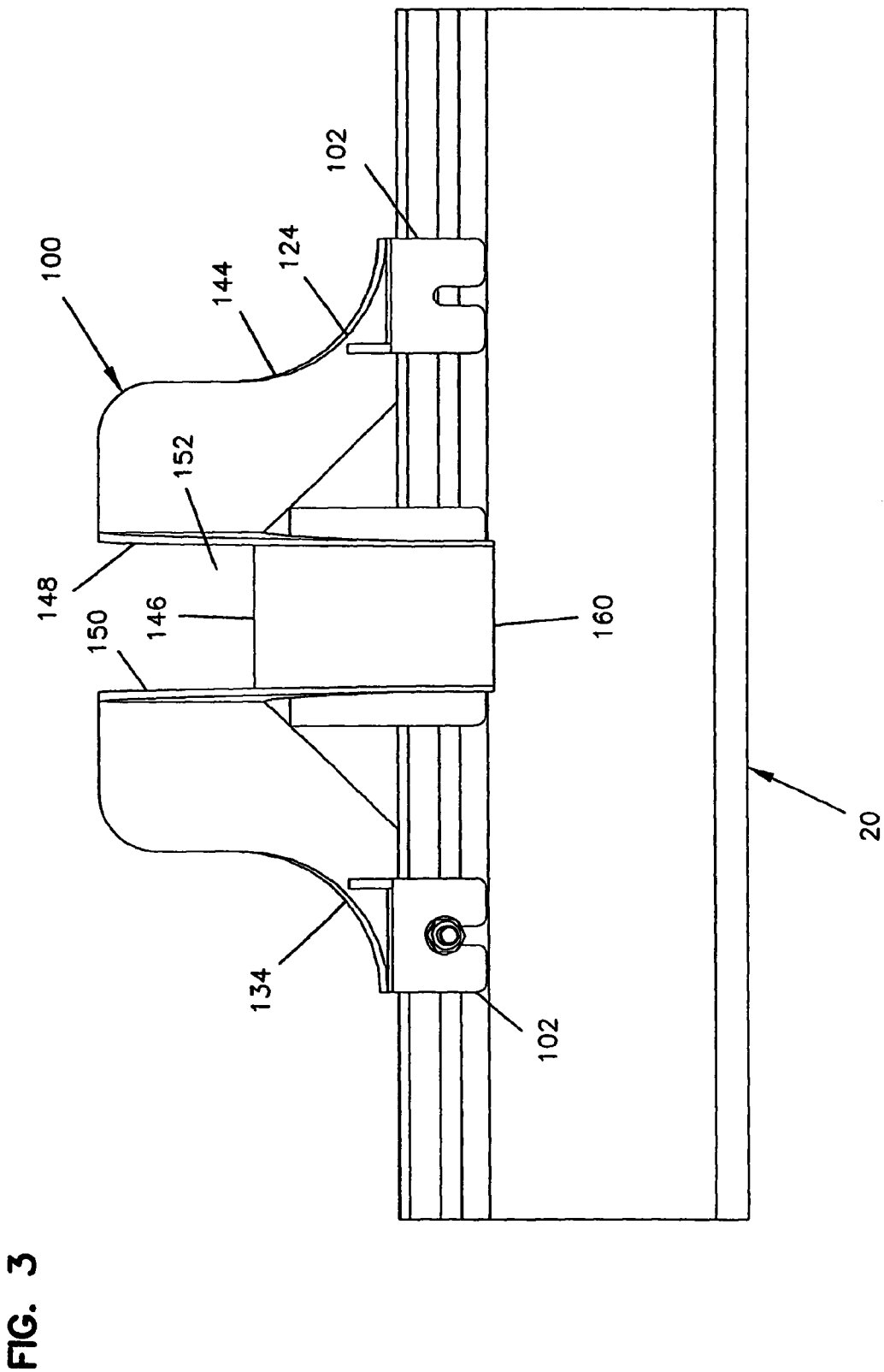
FIG. 3 is a back view of the first embodiment.
Figure 4:
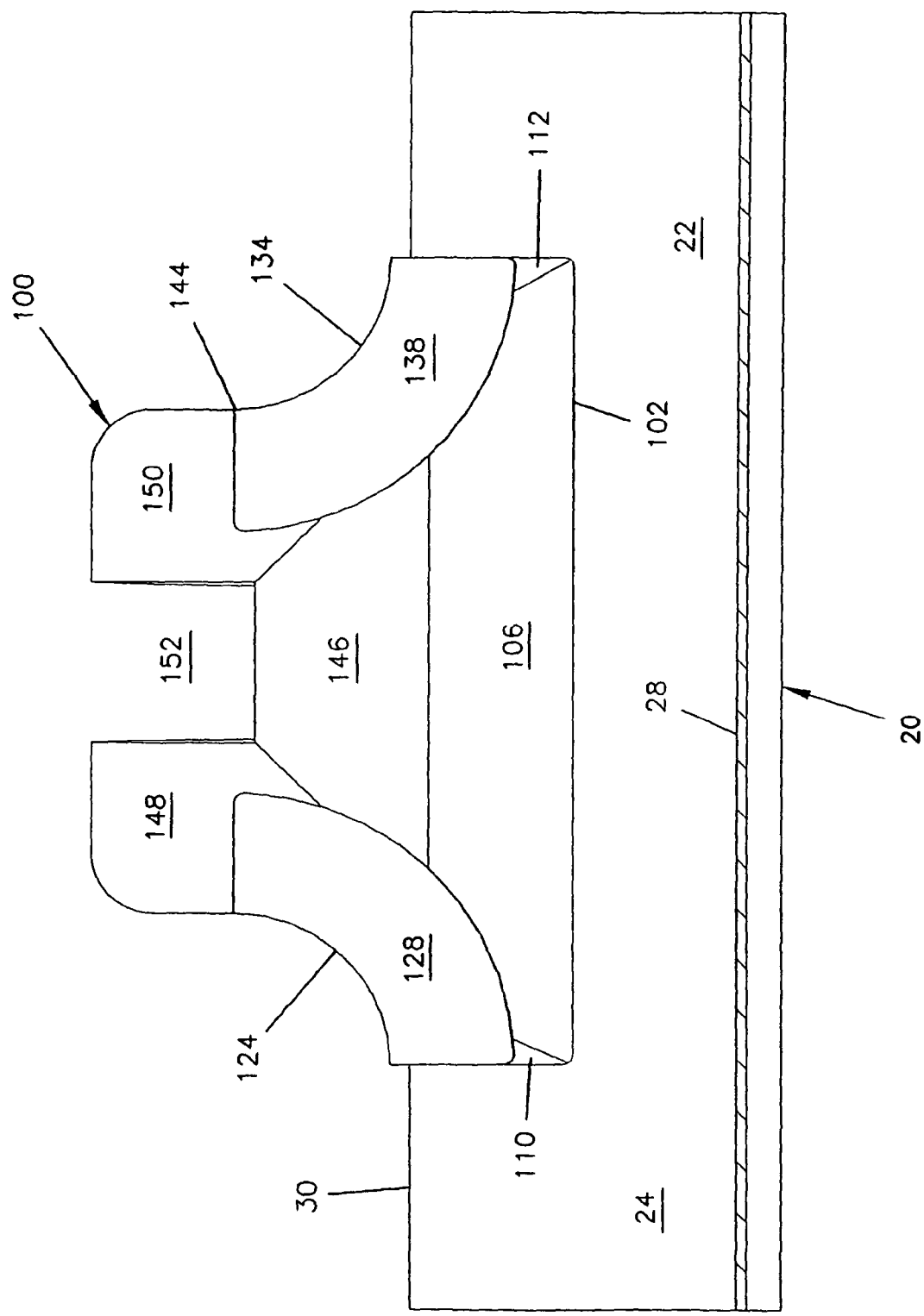
FIG. 4 is a front view of the first embodiment, and showing the lateral trough section in cross-section through a middle of the lateral trough section.
Figure 5:
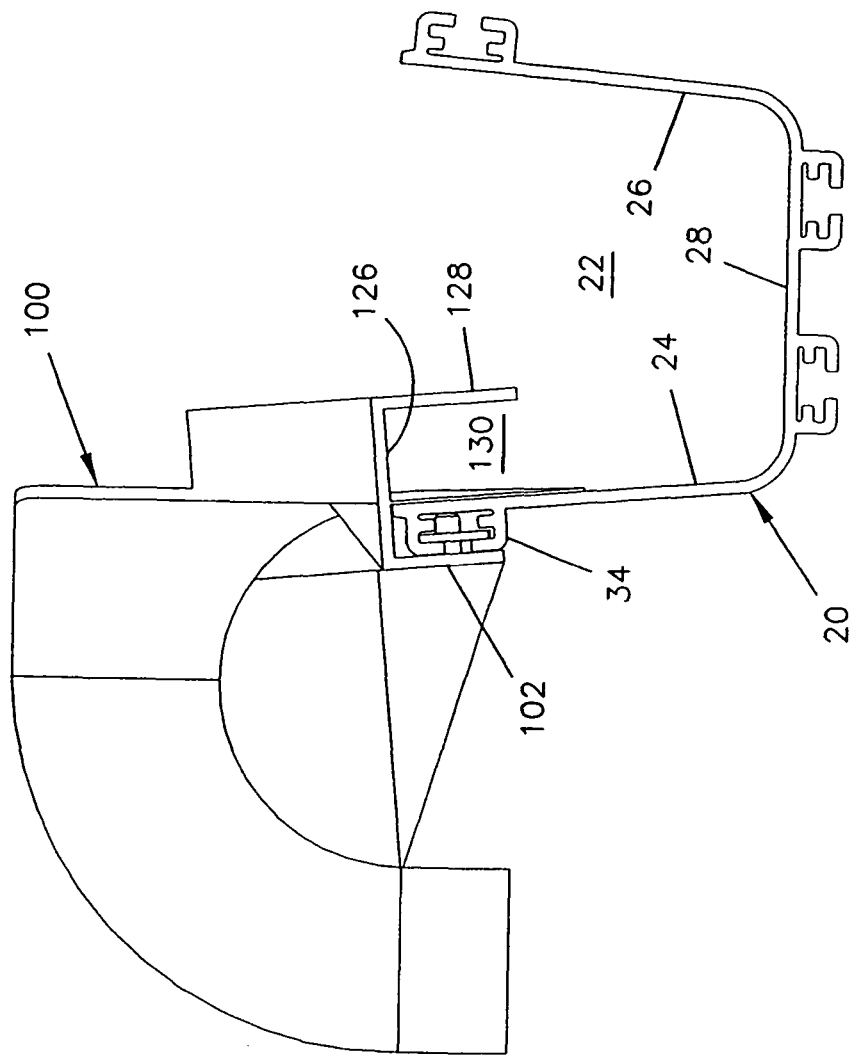
FIG. 5 is a left side view of the first embodiment.
Figure 6:
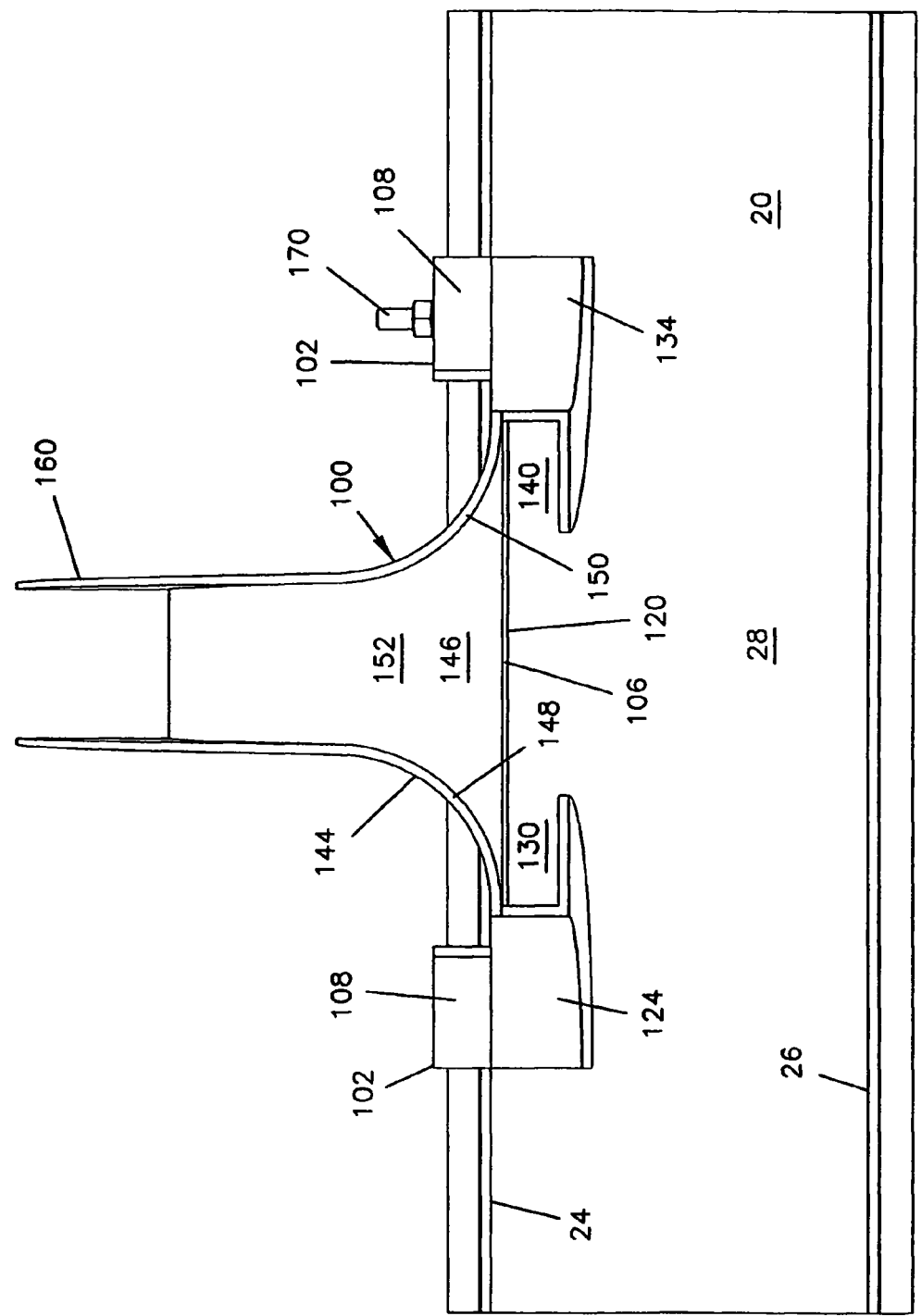
FIG. 6 is a top view of the first embodiment.
Figure 7:
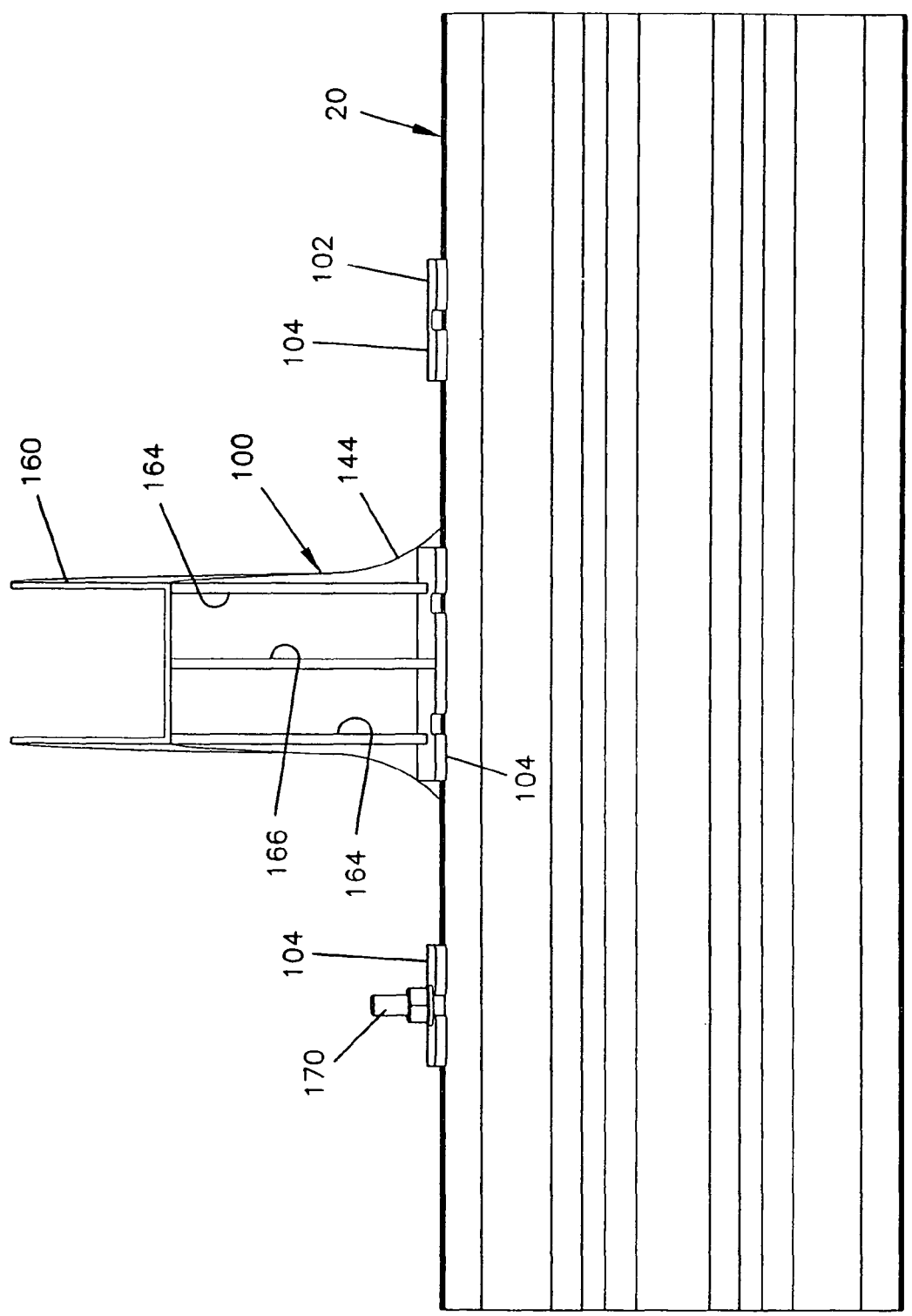
FIG. 7 is a bottom view of the first embodiment.
Figure 8:
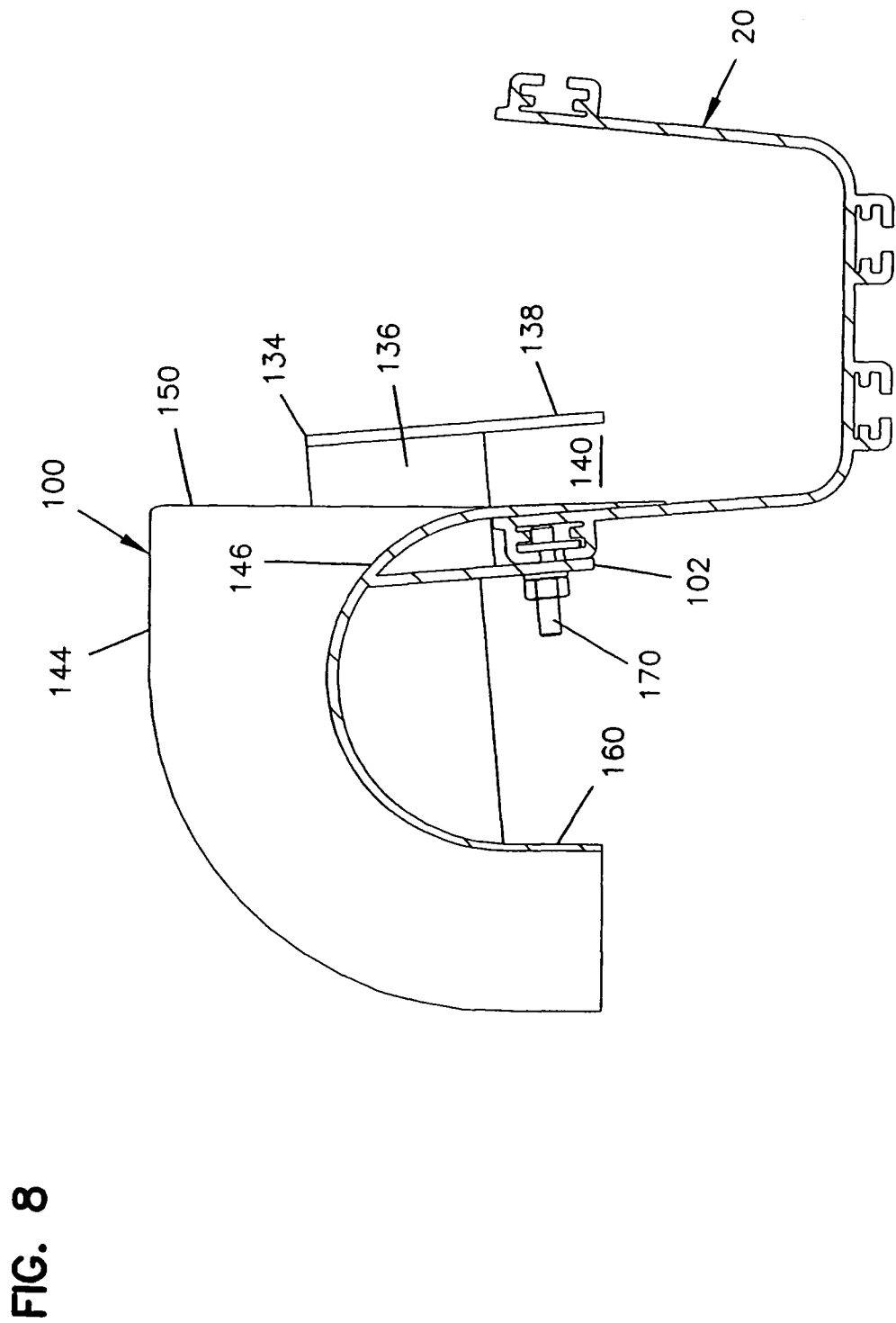
FIG. 8 is a left cross-sectional side view through the center of the lateral trough section and through the exit trough.
Figure 9:
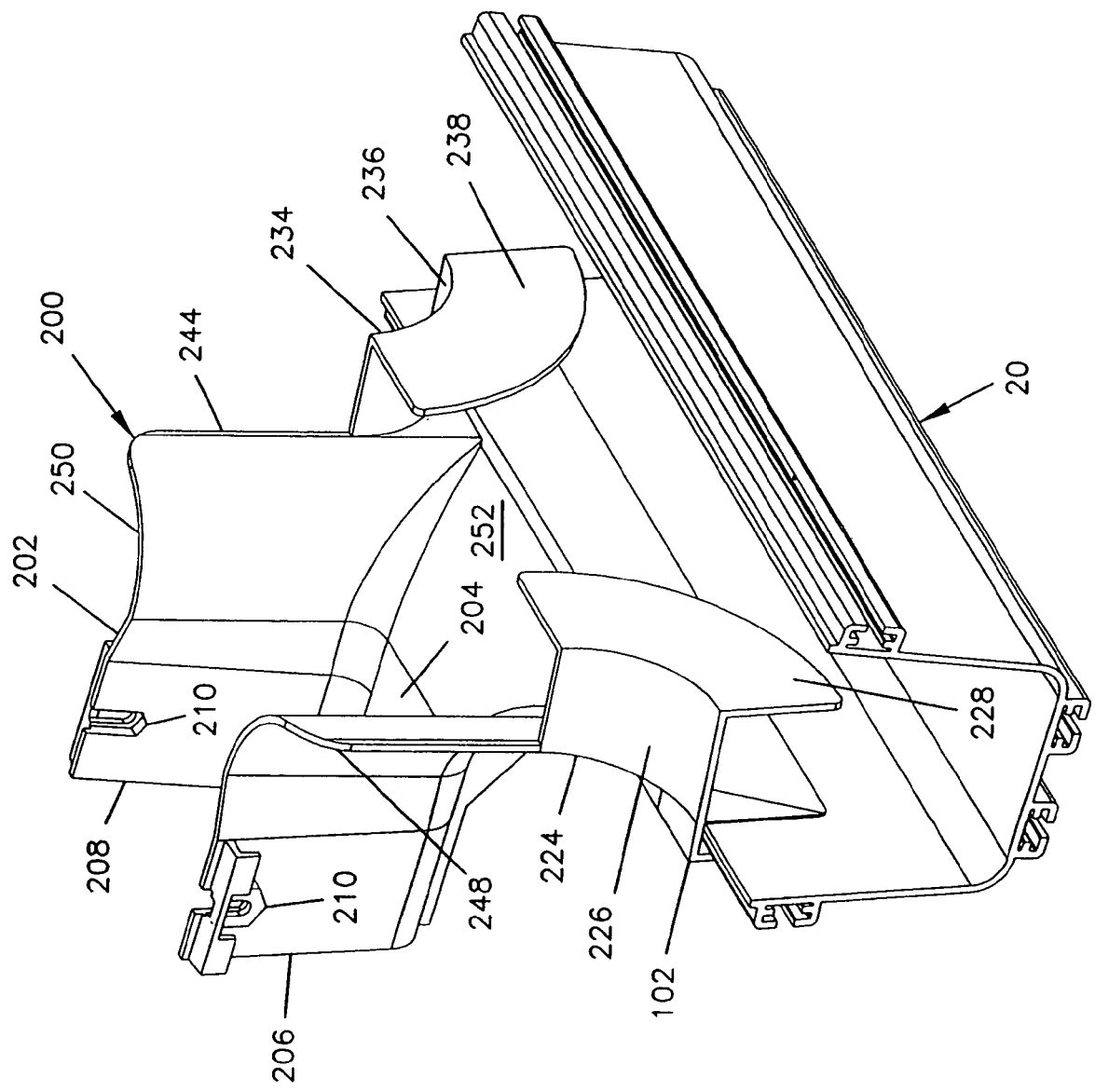
FIG. 9 is a top, front, and left side perspective view of a lateral trough section and an exit trough mounted thereto according to the second preferred embodiment of the present invention.
Figure 10:
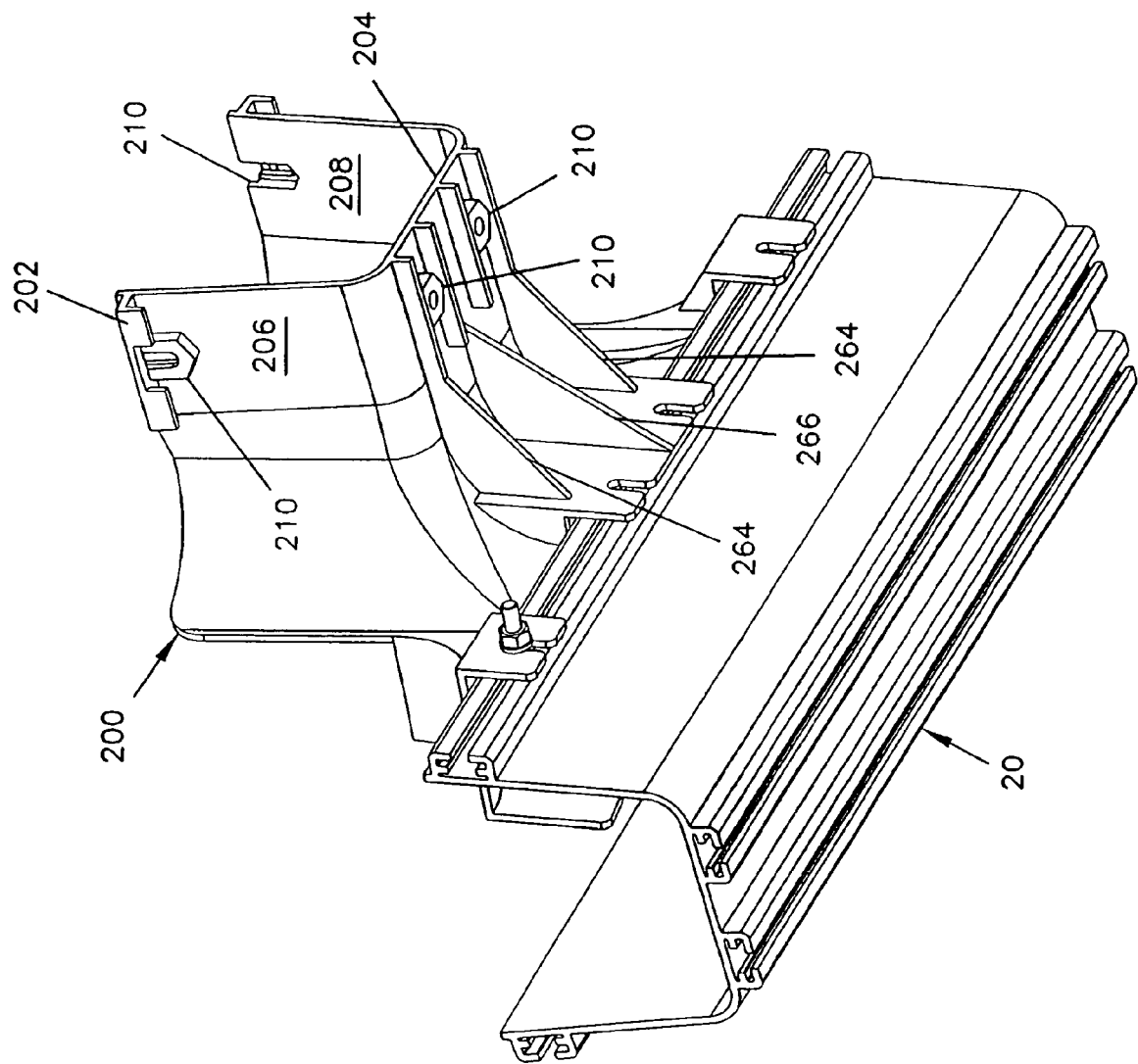
FIG. 10 is a bottom, back, and right side perspective view of the second embodiment.
Figure 11:
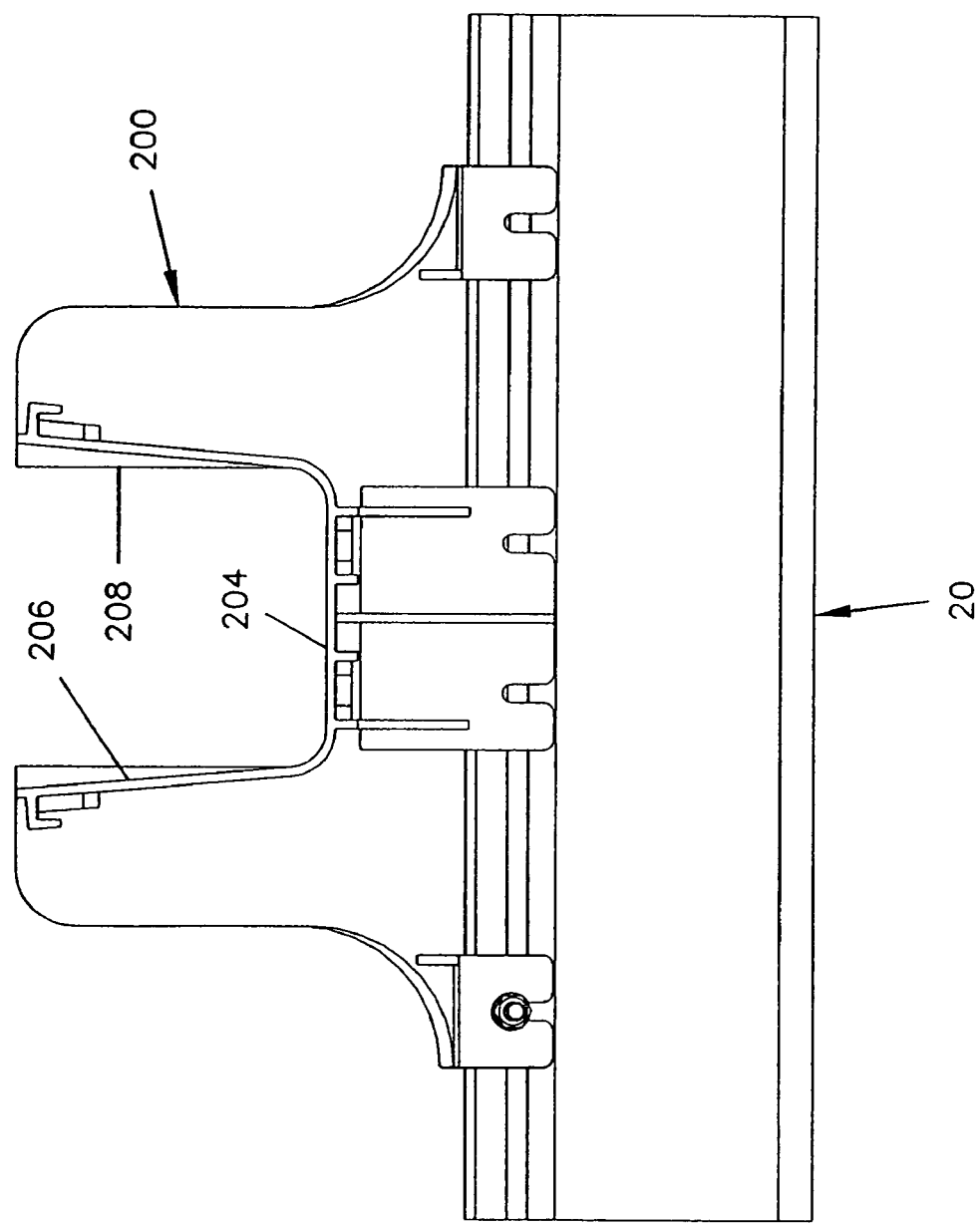
FIG. 11 is a back view of the second embodiment.
Figure 12:
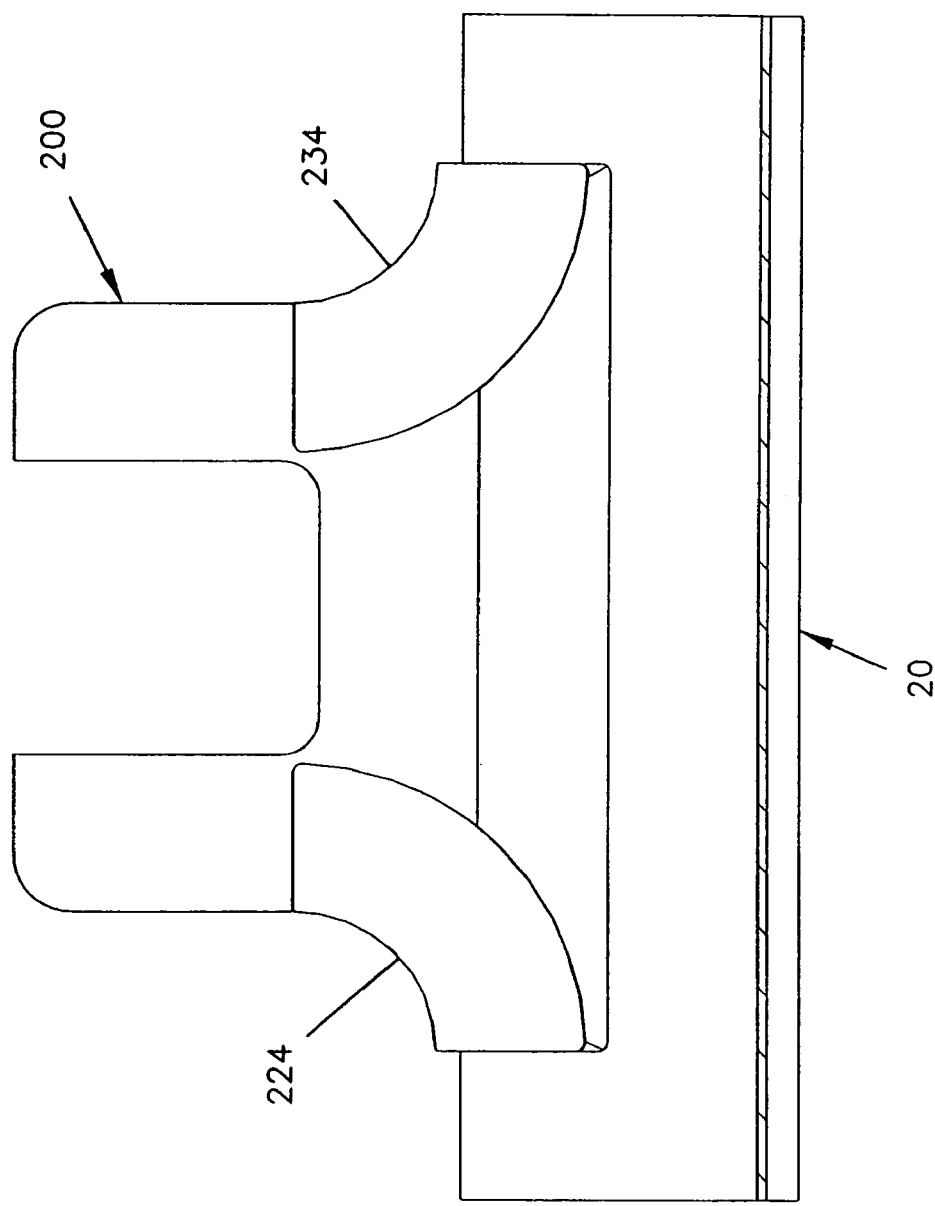
FIG. 12 is a front view of the second embodiment, and showing the lateral trough section in cross-section through a middle of the lateral trough section.
Figure 13:
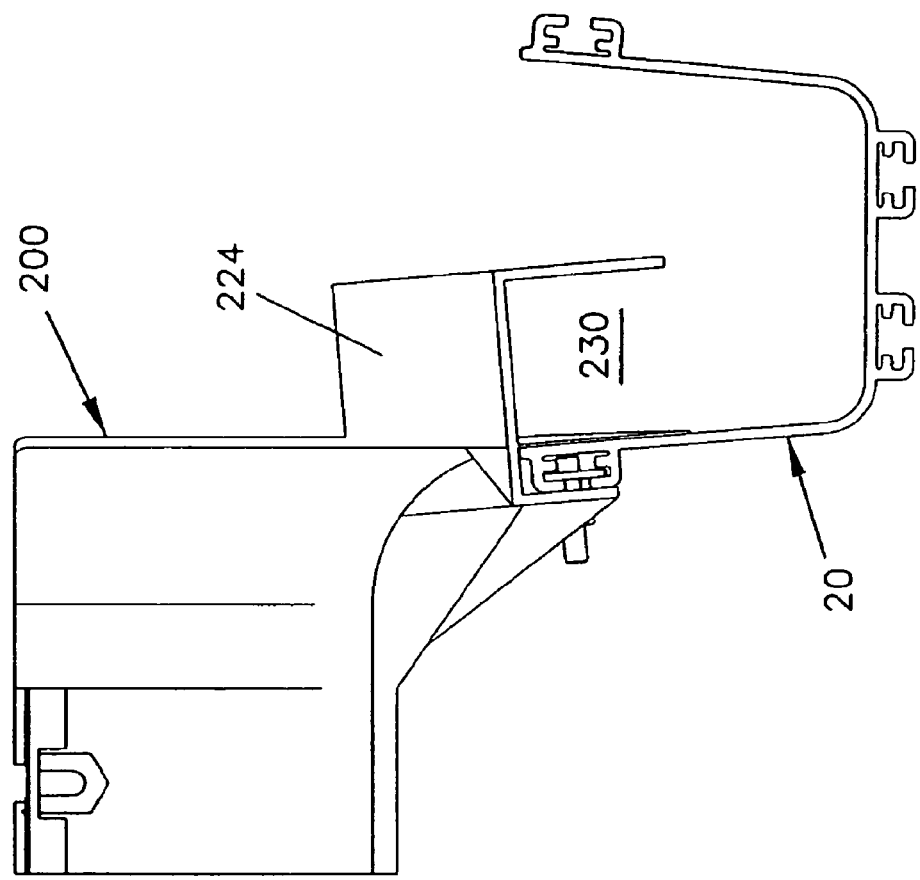
FIG. 13 is a left side view of the second embodiment.
Figure 14:
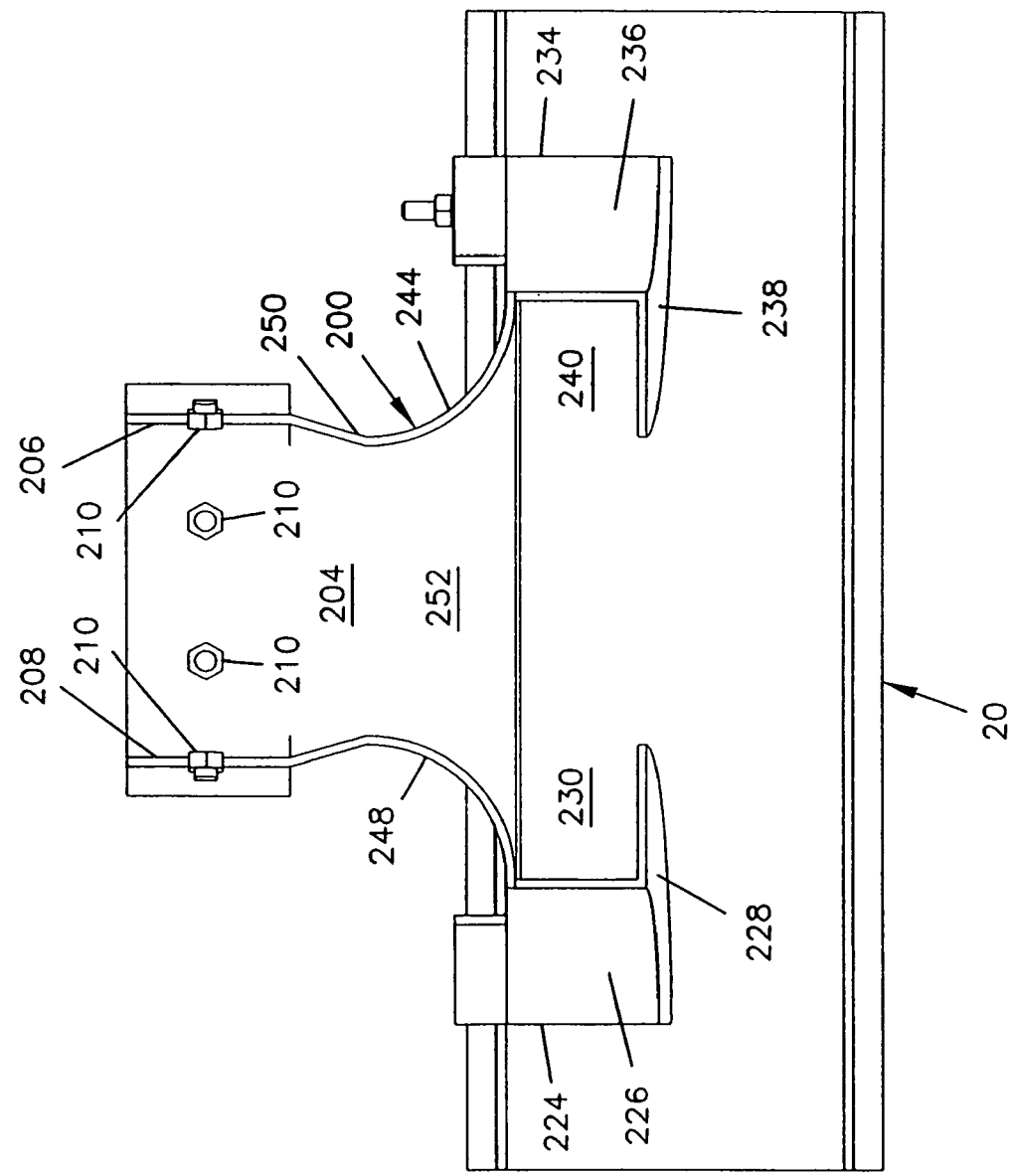
FIG. 14 is a top view of the second embodiment.
Figure 15:
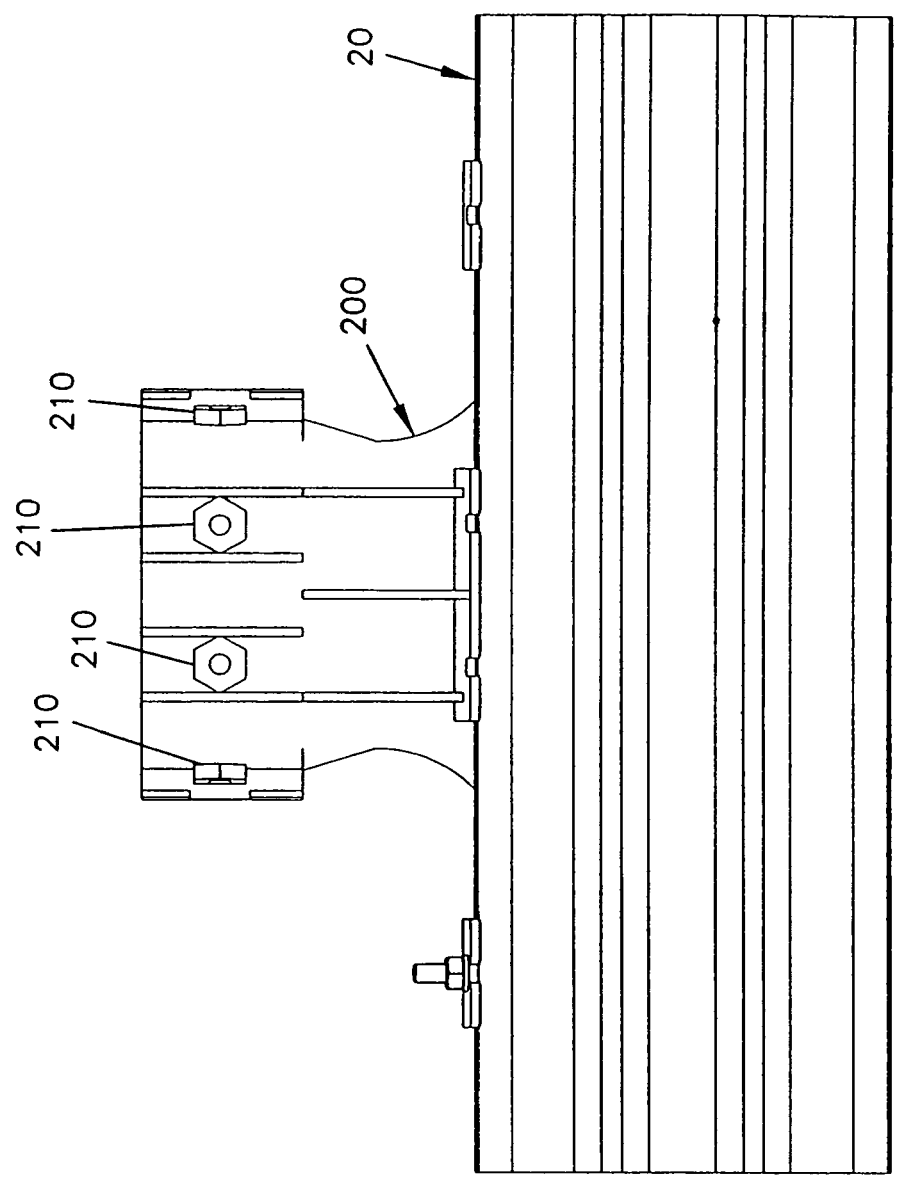
FIG. 15 is a bottom view of the second embodiment.
Figure 16:
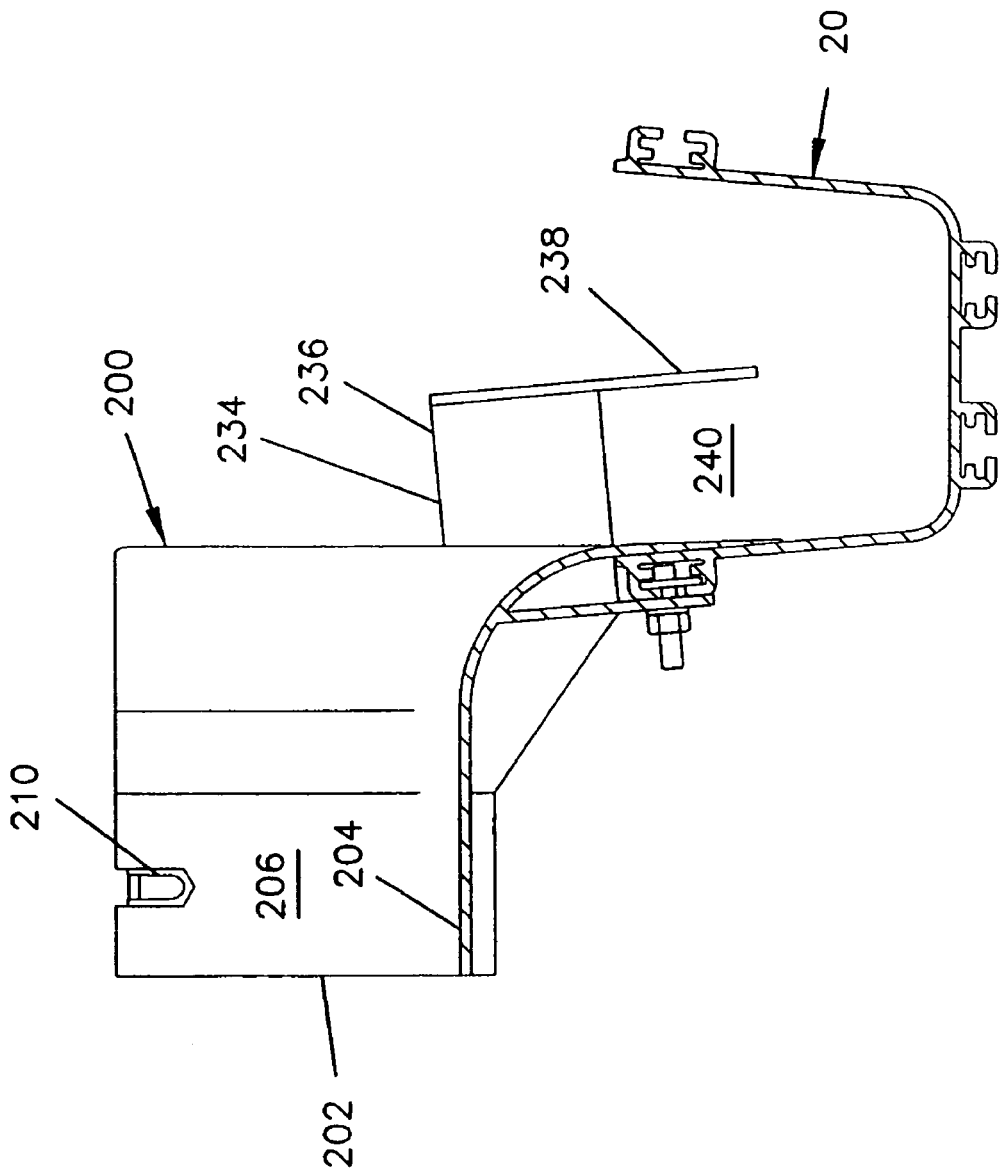
FIG. 16 is a left cross-sectional side view through the center of the lateral trough section and through the exit trough.

Exit trough 100 includes a bracket portion 102 including an outer projecting member 104, an inner projecting member 106, and a connecting member 108. Bracket portion 102 generally defines a U-shape for receipt of a portion of side 24 such that top edge 30 is positioned adjacent to connecting member 108. Exit trough 100 conveniently and securely mounts to lateral trough section 20 via one or more fasteners 170 positioned through outer projecting member 104 and engaged with attachment member 34 of lateral trough section 20, as shown in FIGS. 2, 3, and 5-8. As shown in FIGS. 2 and 3, outer projecting member 104 includes separate spaced apart portions 104a, 104b, 104c. Alternatively, the individual portions 104a-c could be constructed as a single piece. Portion 104a includes a slot 172 for receipt of fastener 170 during assembly. The other portions 104b and 104c include similar slots.

For protection of the optical fiber cables, inner projecting member 106 of bracket portion 102 includes tapered ends 110, 112, and a tapered middle 114. Bracket portion 102 generally extends from a first end 116 to a second end 118. A middle 120 is positioned between the first and second ends 116, 118. At first and second ends 116, 118, two cable lead-ins 124, 134 are provided. First lead-in 124 includes an upper surface portion 126 having an upwardly curved shape. A downwardly depending flange 128 extends toward bottom 28 of lateral trough section 20. Flange 128 is spaced apart from inner projecting member 106 of bracket portion 102 to define a cable pathway 130. Second lead-in 134 at an opposite end of bracket portion 102 faces in an opposite direction to first lead-in 124. Second lead-in 134 includes a similarly configured upwardly curved surface 136, and a downwardly depending flange 138 defining a cable pathway 140 for cables entering exit trough 100 from an opposite end of lateral trough section 20.

Exit trough 100 includes an exit trough portion 144 extending from bracket portion 102 at middle 120 away from lateral trough section 20. Exit trough portion 144 includes a bottom trough surface 146 and upstanding sides 148, 150 on opposite sides of bottom trough surface 146. Generally bottom trough surface 146 extends upwardly and away from top edge 30 of lateral trough section 20, and includes a convex shape. Upstanding sides 148, 150 extend from each respective lead-in 124, 134, and also define convex shapes. Exit trough portion 144 defines a cable pathway 152 linked to cable pathway 22 of lateral trough section 20 via cable pathways 130, 140 of lead-ins 124, 134.

In exit trough 100, exit trough portion 144 links lateral trough section 20 to a downspout 160. Downspout 160 generally provides a cable pathway for cable exiting in a downward direction relative to lateral trough section 20. Downspout 160 is supported by two side ribs 164 and a center rib 166 connected to bracket portion 104b.

With exit trough 100 mounted to lateral trough section 20, cable extending generally horizontally to the ground through lateral trough section 20 is allowed to route upwardly and away from lateral trough section 20, and then to route downwardly through downspout 160 for connection to optical transmission equipment, or other uses. Downspout 160 is connectable via any suitable means to other cable routing components, such as vertical troughs or conduit, as desired. The various curves provided with exit trough 100 help protect the optical fiber cables from being bent beyond a minimum radius of curvature.

Referring now to FIGS. 9-16, a second embodiment of an exit trough 200 is shown. Like parts to parts in exit trough 100 are identified by the same reference numerals noted above for exit trough 100. Exit trough 200 differs in two main respects. First, instead of downspout 160, second exit trough 200 includes a horizontal portion 202 leading from exit trough portion 244. Horizontal portion 202 includes a generally horizontal bottom 204 and two upstanding sides 206, 208 leading from exit trough portion 244. Two side ribs 264, and a center rib 266 extending from bracket portion 102 support horizontal portion 202. Horizontal portion 202 is useful for linking lateral trough section 20 to other cable routing components interconnectable to horizontal portion 202 through any suitable means. Fastener recesses 210 are shown as one example of suitable structures for mounting to other components.

A second main difference between the second exit trough 200 and the first exit trough 100, is that lead-ins 224, 234 and exit trough portion 244 are sized to define larger cable pathways 230, 240, and 252. Specifically, upper surface portions 226, 236 and flanges 228, 238 are sized for defining the larger pathways 230, 240 relative to pathways 130, 140 of first exit trough 100. Also upstanding sides 248, 250 are taller and spaced further apart to define larger pathway 252 relative to pathway 152 of first exit trough 100. This illustrates that relative sizes of the features of exit troughs 100, 200 can be varied depending on the cable routing needs in the system.

Each of the disclosed exit troughs 100, 200 allows for exit pathways from the lateral trough section 20 without modification to the lateral trough section 20. This is useful during initial system setup, and also during modifications of the system at later dates. Exit troughs 100, 200 can be added at any time quickly and easily. Cable damage is avoided since any cables in lateral trough section 20 are not disturbed and do not have to be moved when exit troughs 100, 200 are added. Also, simple fasteners are all that is needed to mount the bracket portion 102 of the exit troughs 100, 200 to the lateral trough section 20. In addition to the downspout 160, and the horizontal portion 202, other directional components are possible from exit trough portions 144, 244 of each exit trough 100, 200.

Having described the present invention in a preferred embodiment, modifications and equivalents may occur to one skilled in the art. It is intended that such modifications and equivalents shall be included within the scope of the claims which are appended hereto.

What is claimed is:

1. A cable routing system, comprising:
   a) a lateral trough section defining a cable pathway substantially horizontal to the ground and having an upstanding side of substantially uniform height terminating at a top edge; and
   b) a cable exit component releasably mountable to the lateral trough section, the cable exit component including a body having:
      i) a convexly curved first surface extending in a direction leading away from the lateral trough section in a direction substantially perpendicular to the lateral trough section and defining an apex located outside the lateral trough section at a point higher than the top edge and laterally offset from the upstanding side, the first surface having a first curved portion leading upwardly relative to the lateral trough section from adjacent the top edge to the apex, the first curved portion being curved so as not to violate a minimum cable bend radius, and with a second curved portion leading from the apex downwardly and away from the first curved portion, the second curved portion being curved so as not to violate the minimum cable bend radius, wherein the first surface, when the cable exit component is mounted to the lateral trough section, defines a curved cable exit pathway for guiding a plurality of cables over the upstanding side of the lateral trough section, then in a downward direction; and ii) a first lead-in and a second lead-in positioned adjacent to opposite sides of the first surface and positioned directly above a bottom of the lateral trough section when the cable exit component is mounted to the lateral trough section, wherein when the cable exit component is mounted to the lateral trough section the first lead-in includes a curved surface positioned to transition cables toward the cable exit pathway from the lateral trough section from a first direction while maintaining a cable minimum bend radius, and the second lead-in includes a curved surface positioned to transition cables toward the cable exit pathway from a second direction opposite the first direction while maintaining a cable minimum bend radius.

2. The cable routing system of claim 1, further including two side surfaces positioned adjacent opposite side portions of at least one of the first and second curved portions of the first surface.

3. The cable routing system of claim 2, wherein the two side surfaces are integrally formed with the first surface.

4. The cable routing system of claim 2, wherein the two side surfaces include curved portions that assist in defining the cable exit pathway.

5. The cable routing system of claim 4, wherein the curved portions of the two side surfaces are integrally formed with the first surface.

6. The cable routing system of claim 1, wherein the cable exit component is releasably mounted to the lateral trough section using a bracket.

7. The cable routing system of claim 6, wherein the cable exit component is releasably mounted to the lateral trough section using the bracket and at least one fastener.

8. The cable routing system of claim 6, wherein the bracket is integrally formed with the cable exit component.

9. The cable routing system of claim 1, wherein the curved surface of the first lead-in is a first guide surface that leads upwardly and does not extend into the lateral trough section, and wherein the first guide surface curves in a direction substantially perpendicular to the lateral trough section.

10. The cable routing system of claim 1, wherein the first and second lead-ins each include a flange substantially parallel to and spaced inwardly from the upstanding side when the cable exit component is mounted to the lateral trough section.

11. The cable routing system of claim 1, further including a downspout, wherein the downspout includes a substantially vertical portion having opposing side surfaces.

12. The cable routing system of claim 1, wherein the first and second lead-ins each include at least one additional surface positioned over a bottom surface of the lateral trough section and spaced from the first surface to allow cables to pass between the additional surface and the first surface when the cable exit component is mounted to the lateral trough section.

13. The cable routing system of claim 12, wherein the at least one additional surface is a downwardly depending flange spaced from the first surface by the curved surface of the first lead-in.

14. The cable routing system of claim 1, further including a downspout, wherein the cable exit pathway links the lateral trough section to the downspout so that cables can be routed upwardly from the lateral trough section, over the top edge of the lateral trough section, and then downwardly through the downspout.

15. The cable routing system of claim 1, wherein the curved surfaces of the first and second lead-ins curve upwardly and define a top boundary of a cable path.

\* \* \* \* \*